United States Patent [19]

Jarvis

[11] Patent Number: 4,829,564
[45] Date of Patent: May 9, 1989

[54] DISTRIBUTION FRAME BOARD

[76] Inventor: J. Michael Jarvis, P.O. Box 505, Richmond, Va. 23204

[21] Appl. No.: 64,158

[22] Filed: Jun. 18, 1987

[51] Int. Cl.$^4$ .................... H01R 23/02; H01R 31/00; H04Q 1/14; H04Q 1/18
[52] U.S. Cl. ................................ 379/327; 379/332; 439/296; 439/540; 439/701
[58] Field of Search ................. 379/19, 397, 325, 326, 379/327, 332, 165, 156; 439/296, 540, 626, 701

[56] References Cited

U.S. PATENT DOCUMENTS

| | | | |
|---|---|---|---|
| 787,930 | 4/1905 | Mason | 379/325 X |
| 3,156,783 | 11/1964 | Alexandersson et al. | 379/325 |
| 3,610,836 | 10/1971 | Kimura et al. | 379/325 |
| 3,699,497 | 10/1972 | Cooper, Jr. et al. | 439/588 |
| 3,813,635 | 5/1974 | Cooper, Jr. et al. | 439/724 |
| 3,833,840 | 9/1974 | Sinden | 361/428 |
| 3,855,427 | 12/1974 | Sinden | 361/428 |
| 3,899,237 | 8/1975 | Briggs, Jr. | 439/405 |
| 3,909,543 | 9/1975 | Miller | 379/184 |
| 4,018,997 | 4/1977 | Hoover et al. | 379/164 |
| 4,140,885 | 2/1979 | Verhagen | 379/165 |
| 4,179,170 | 12/1979 | Splitt et al. | 439/107 |
| 4,326,107 | 4/1982 | Perna | 379/325 |
| 4,331,839 | 5/1982 | Baumbach | 379/19 |
| 4,575,840 | 3/1986 | Hargrave et al. | 370/13 |
| 4,583,215 | 4/1986 | Hargrave et al. | 370/13 |
| 4,603,377 | 7/1986 | Kobayashi et al. | 361/429 |
| 4,653,092 | 3/1987 | Neail et al. | 379/327 |
| 4,670,626 | 6/1987 | Fisher et al. | 178/1 |
| 4,712,232 | 12/1987 | Rodgers | 379/329 |

FOREIGN PATENT DOCUMENTS 2635544 2/1978 Fed. Rep. of Germany ...... 379/332

OTHER PUBLICATIONS

"AMPIX Modular Cross-Connect System for Premises Information", AMP Inc. of Harrisburg, Pennsylvania (1986), 4 pages.
"66 Connector Technology" (undated), 2 pages.
"AMP Modular Premises Information Cross-Connect System (AMPIX*)", Information Sheet IS3185, AMP Inc. of Harrisburg, Pennsylvania (10/1/86), 1 page.
"System 75: Physical Architecture and Design", Loverde et al., AT&T Technical Journal, vol. 64, No. 1, Jan. 1985, pp. 175-195.

Primary Examiner—Thomas W. Brown
Attorney, Agent, or Firm—Joseph G. Seeber

[57] ABSTRACT

A main distribution frame (MDF) board for connecting a plurality of stations to a system or switch, or an intermediate distribution frame (IDF) board for connecting an input cable to an output cable, comprises: sets of barrel connectors to which the stations are wired (in the MDF embodiment) or an input connector for connecting the input cable to the board (in the case of the IDF embodiment); an output connector for connecting the output cable to the board; and a plurality of jacks for interconnecting the barrel connectors or input connector to the output connector. The jacks utilized in this arrangement, and their corresponding plugs, are designed such that, when a plug is not inserted into a jack, odd numbered pins are connected to even numbered pins within the jack. Conversely, when the plug is inserted into the jack, the aforementioned connection is broken. Accordingly, problems occurring in the board wiring between the even numbered pins of a jack and the output connector can be easily bypassed by an unskilled person by inserting one end of a jumper cable into the jack, identifying a further unused jack, and inserting a plug at the other end of the jumper cable into the unused jack.

7 Claims, 3 Drawing Sheets 1,3,5,7 = STATION SIDE
2,4,6,8 = SYSTEM OR SWITCH SIDE

DISTRIBUTION FRAME BOARD

TECHNICAL FIELD

The invention generally relates to a distribution frame board, and more particularly a main distribution frame (MDF) board for connecting a plurality of stations to a multi-pair cable, or an intermediate distribution frame (IDF) board for connecting multi-pair input and output cables. In each case, the distribution frame board is easily maintainable by a non-skilled person.

BACKGROUND ART

For quite some time, distribution frames have been utilized to interconnect outside cable and inside cable, or to interconnect a plurality of stations with a multi-pair cable. Such distribution frames can be modular in nature, being made up of MDF or IDF boards or modules.

The use of such modules or boards is demonstrated in the following U.S. Pat. Nos.: 3,833,840; 3,855,427; and 4,603,377. Such arrangements have the disadvantage of not being able to be maintained or repaired by the non-skilled person. Accordingly, in the past, when problems have occurred within the board, it has been necessary for the user to call a telephone repairman, resulting in much loss of time and money.

The following U.S. patents are considered to be representative of the prior art with regard to MDF arrangements: U.S. Pat. Nos. 3,156,783; 3,610,836; 3,899,237; 4,179,170; 4,331,839; 4,575,840; 4,583,215; and 4,653,092. Finally, the following U.S. patents are considered to be merely of background interest relative to the present invention: U.S. Pat. Nos. 3,699,497; 3,813,635; and 3,909,543.

To summarize, it would be desirable to have a specially designed distribution board which would permit an unskilled user to bypass technical problem areas occurring in the board by taking simple corrective action, even if it is only of a temporary nature, to resolve the problem. Then, permanent solutions to the technical problem could be implemented during planned, periodic visits of telephone repair personnel. This would save time in that the user could obtain an immediate solution to the technical problem, and money in that maintenance visits to various sites could be consolidated and/or reduced.

DISCLOSURE OF INVENTION

The invention generally relates to a distribution frame board for interconnecting a plurality of stations to a multi-pair cable or for interconnecting an input cable to an output cable. More specifically, the invention relates to an MDF or IDF board which is specially designed to permit an unskilled user to bypass technical problems occurring in the board by merely inserting a jumper wire or cable into specially designed telephone jacks located on the board.

The invention also includes a telephone jack specially designed for use with the board described above. This specially designed jack makes a certain type of connection in the absence of insertion of a plug into the jack, and breaks that connection when the plug is inserted into the jack This is in contrast to conventional jacks (such as the RJ11) which make one type of connection (such as connection to a shorting bar) in the absence of insertion of a plug, and which make a different type of connection when a plug is inserted.

Therefore, it is a primary object of the present invention to provide a distribution board for connecting a plurality of stations to a multi-pair cable or for connecting multi-pair input and output cables.

It is an additional object of the present invention to provide a distribution board which is specially designed to permit an unskilled user to bypass technical problem areas in the board.

It is an additional object of the present invention to provide a distribution board in which technical problems can be resolved by merely inserting a jumper wire or cable into specially designed jacks located on the board.

It is an additional object of the present invention to provide a specially designed jack which, in the absence of insertion of a plug into the jack, makes a certain type of connection, and which, when a plug is inserted into the jack, breaks that connection.

The above and other objects of the invention will be more clearly understood by reference to the following detailed description, the appended claims, and the drawings.

BEST MODE FOR CARRYING OUT THE INVENTION

The invention will now be described in more detail with reference to the various figures.

Figure 1:
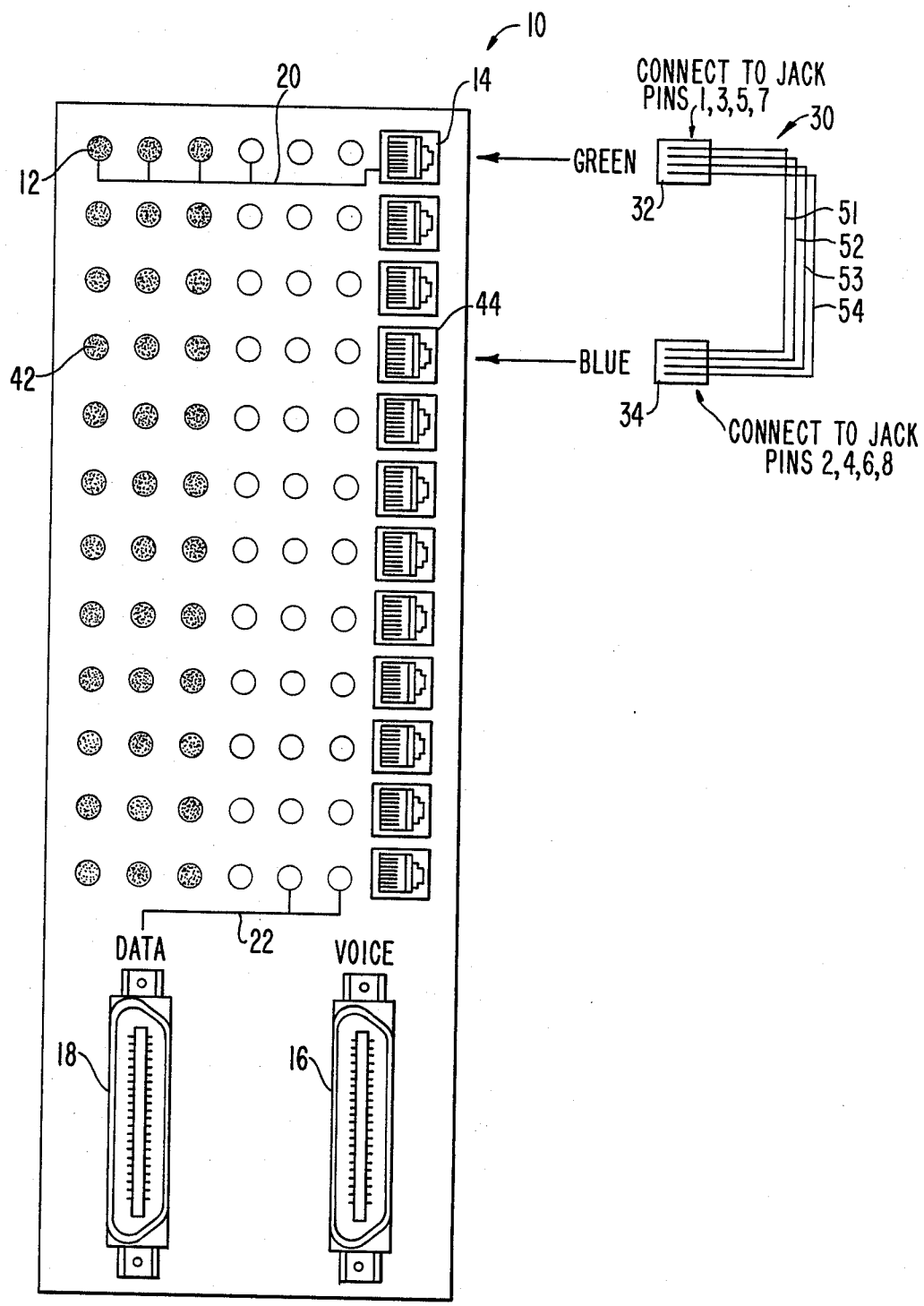
FIG. 1 is a diagrammatic representation of an MDF board in accordance with the present invention.

FIG. 1 is a diagrammatic representation of the MDF board of the present invention. As seen therein, the MDF board 10 comprises the following elements: an array of barrel connectors, such as barrel connector 12, arranged in rows and columns on the board 10; special jacks, such as jack 14, arranged in a column, there being one jack associated with each row of barrel connectors; a multi-pair cable connector 16 for handling voice communication; and a multi-pair data connector 18 for handling data communication.

In this embodiment of the invention, a plurality of stations or telephones (not shown) are wired directly to respective sets (or rows) of barrel connectors. Thus, the top row of barrel connectors 12 would be wired to a first station, the next row of barrel connectors would be wired to a second station, and so forth.

In addition, each row of barrel connectors contains four barrel connectors (the first four barrel connectors from the left in FIG. 1) internally wired, within the board 10, to respective metal contacts or pins (not shown in FIG. 1) of associated jack 14. This internal wiring is illustrated by the interconnecting line 20 in FIG. 1. The fifth and sixth barrel connectors in each row are for data communication, and are wired directly to the data connector 18, as indicated by the interconnecting line 22 in FIG. 1.

Furthermore, in accordance with the invention, four other metallic contacts or pins within each jack 14 are internally wired, within the board 10, to respective pins of the voice pin connector 16 of FIG. 1. Thus, the four pins in each of the twelve jacks 14 shown in FIG. 1 (for a total of forty-eight pins) are wired to corresponding forty-eight pins of the connector 16. Since the connector 16 is typically a fifty-pin connector, two pins are considered spare.

Finally, the board 10 is connected via the connector 16 to an external multi-pair cable which carries voice communication to a switching center, private branch exchange (PBX), or other similar facility.

The operation of the MDF board 10 of FIG. 1 will now be described with reference to FIG. 2A, which is a diagrammatic illustration of the jack 14 of FIG. 1, and with respect to FIG. 2B, which is an explanatory interconnection or wiring diagram relating to the operation of the jack 14.

Figure 2A:
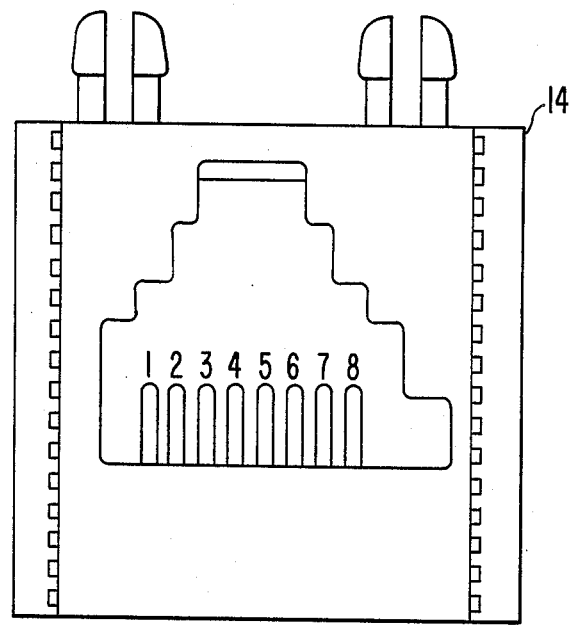
FIG. 2A is a diagrammatic representation of the specially designed jack of the present invention.

As seen in FIG. 2A, the jack 14 is, in general, similar in structure to conventional telephone jacks in use in the prior art. However, the jack 14 of the present invention is uniquely designed in that it contains eight metallic contacts or pins 1 thru 8, as seen in FIG. 2A. In addition, the unique design of the jack 14 is such that, without the insertion of a companion plug into the jack 14, a novel and unique interconnection of the pins 1–8 occurs. Moreover, when a companion plug is inserted into the jack 14, the previous interconnections are "broken" and any of the pins can be selected for connection to corresponding pins in the plug in accordance with the design of the plug, as will be discussed in more detail below. This unique design and operation of the jack 14 makes it an advantageous component of the MDF board 10 of FIG. 1.

Figure 2B:
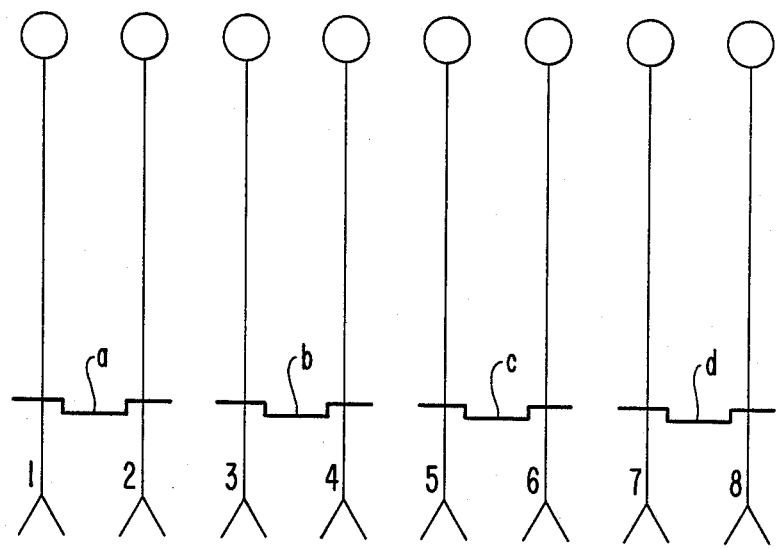
FIG. 2B is an interconnection diagram relating to the operation of the jack of FIG. 2A.

Referring to FIGS. 1, 2A and 2B, the internal wiring of the MDF board 10 is such that the odd pins 1, 3, 5 and 7 of the jack 1 are wired to the first four barrel connectors 12, respectively, in the row associated with jack 14. Moreover, even pins 2, 4, 6 and 8 are wired to respective pins of voice connector 16 which are, in turn, connected via a multi-pair cable to the system or switch (not shown).

When a companion plug is not inserted into the jack 14, the interconnection shown in FIG. 2B occurs. Specifically, pin 1 is connected to pin 2 via shorting bar a, pin 3 is connected to pin 4 via shorting bar a, pin 5 is connected to pin 6 via shorting bar c, and pin 7 is connected to pin 8 via shorting bar d. Thus, without a plug inserted into the jack 14, the path from the station or telephone instrument via the MDF board 10 to the system or switch is as follows: station or telephone instrument wiring; first four barrel connectors 12; pins 1, 3, 5 and 7 of jack 14; shorting bars a, b, c and d; pins 2, 4, 6 and 8 of jack 14; the four corresponding pins of voice connector 16; and corresponding pairs of the multi-pair cable extending from voice connector 16 to the system or switch.

When a companion plug is inserted into the jack 14, the aforementioned pin connections (shown in FIG. 2B) are "broken" (i.e., pins 1–8 are separated from shorting bars a–d and pins 1, 3, 5 and 7 are connected to four corresponding wires in the companion plug itself. This feature of the jack 14 and its associated plug provide the basis for the significant technical advantage afforded by the MDF board 10. This will become clear from the following description of the practical use of the MDF board 10.

Further referring to FIG. 1, the occurrence of a technical problem in the wiring within the MDF board 10 would cause a communication problem between the station being served by the wiring and the switch or system to which the station would otherwise be connected. If MDF boards of the prior art are used, this necessitates a site visit by telephone repair personnel for the purpose of rectifying the wiring problem within the MDF board. However, with the present invention, an unskilled user can, with appropriate direction (for example, instruction from a technician, conveyed by telephone) temporarily rectify the problem so that full use of the telephone or station can resume. The actual repair of the MDF board can be accomplished during a periodic, planned visit by telephone repair personnel.

If a wiring or technical problem occurred between the station served by the first row of barrel connectors 12 and the switch or system, the user would call the telephone repair office and speak to a technician. The technician would instruct the user to take a jumper cable 30, specially designed for the MDF board 10 and previously provided to the user, and to carry out the following instructions: (1) insert the green plug 32 at the end of the jumper cable 30 into jack 14; (2) identify an unused row of barrel connectors and their associated jack (for example, in FIG. 1, barrel connectors 42 and jack 44); and (3) insert the blue plug 34 at the other end of jumper cable 30 into unused jack 44.

As a result of this arrangement, the interconnections of pins 1, 3, 5 and 7 to pins 2, 4, 6 and 8 (FIG. 2B), respectively, in each of jacks 14 and 44 (FIG. 1) are broken. In jumper cable 30, plug 32 is designed so that, when it is inserted into a jack such as jack 14, pins 1, 3, 5 and 7 of the jack 14 are interconnected with wires 51, 52, 53 and 54, respectively of jumper cable 30. Furthermore, plug 34 of jumper cable 30 is designed, so that, when it is inserted into a jack such as jack 44, pins 2, 4, 6 and 8 of jack 44 are interconnected with wires 51, 52, 53 and 54, respectively, of jumper cable 30.

Thus, once the jumper cable 30 is in place between jacks 14 and 44, the path from the station or telephone instrument via MDF board 10 to the system or switch is as follows: station or telephone wiring; the first four barrel connectors 12 of MDF board 10; pins 1, 3, 5 and 7 of jack 14; wires 51, 52, 53 and 54 of jumper cable 30; pins 2, 4, 6 and 8 of jack 44; four corresponding pins of the multi-pin voice connector 16; and four corresponding wires within the multi-pair cable connected between voice connector 16 and the system or switch. In this manner, a technical problem occurring in the MDF board 10 (in this particular case, a problem in the wiring between pins 2, 4, 6 and 8 of jack 14 and corresponding pins of voice connector 16) is bypassed as a result of a simple procedure carried out by an unskilled user. As mentioned earlier, a permanent solution to the problem can be carried out by repair of the problem wiring at the next planned site visit by telephone personnel.

Figure 3:
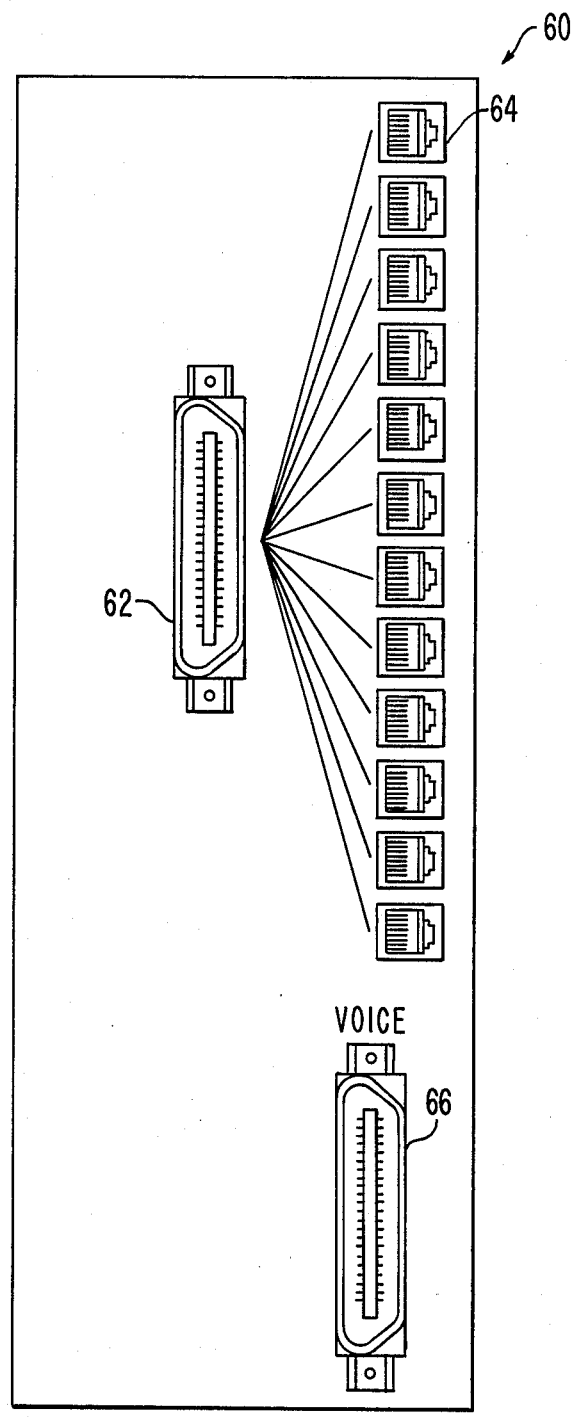
FIG. 3 is a diagrammatic representation of an IDF board in accordance with the present invention.

FIG. 3 is a diagrammatic illustration of an IDF board 60 in accordance with the present invention. As seen in FIG. 3, the IDF board 60 comprises a 50-pin connector 62 (connected via a 25-pair cable to a voice connector 16 of an MDF board 10 as seen in FIG. 1), a column of jacks such as jack 64, and a voice connector 66 (similar to the voice connector 16 in FIG. 1) connected to a system or switch (not shown). Each pin of connector 62 is wired to a respective odd pin of one of the jacks 64, and each even pin of the jacks 64 is wired to a respective pin of connector 66. Although not shown in FIG. 3, it should be recognized that a jumper plug 30 identical in concept and operation to that shown in FIG. 1 is employed with respect to the IDF board 60 of FIG. 3.

Thus, if a problem arose with respect to the internal wiring of IDF board 60, for example, a problem in the wiring between the jack 64 connected to the first four pins of connector 62 and the voice connector 66, the problem could be bypassed by the same three-step procedure described above. Specifically, the plug 32 of jumper cable 30 (FIG. 1) would be inserted into jack 64, a jack associated with a spare set of pins (on connector 62) would be identified, and the plug 34 of jumper cable 30 would be inserted into the jack associated with the spare pins. As a result, a technical problem occurring in the wiring between pins 2, 4, 6 and 8 of jack 64 and the first four pins of voice connector 66 is bypassed.

While preferred forms and arrangements have been shown in illustrating the invention, it is to be understood that various changes in detail and arrangement may be made without departing from the spirit and scope of this disclosure.

I claim:

1. A distribution frame board for connecting a plurality of stations to a multi-par cable, said board comprising:
    a plurality of sets of connectors, each station being wired to a respective set of connectors;
    a multi-pin connector to which the multi-pair cable is connected; and
    a plurality of jacks equal in number to said sets of connectors, each jack being associated with a respective set of connectors, each said jack having a first set of pins connected to its associated set of connectors and a second set of pins connected to respective corresponding pins of said multi-pin connector;
    whereby each station is connected, via its respective set of connectors, the first and second sets of pins of the jack associated with the respective set of connectors, and said multi-pin connector, to said multi-pair cable; and
    wherein jumper cable means are provided for bypassing technical problems occurring in the board with respect to a give station, said jumper cable means having a first plug at one end and a second plug at another end, said first plug being adapted to connect to said first set of pins of a jack when said first plug is inserted into said jack, said second plug being adapted to connect to said second set of pins of a further jack when said second plug is inserted into said further jack;
    whereby, when said first plug is inserted into said jack and said second plug is inserted into said further jack, said given station is connected via its respective set of connectors, the first set of pins of said jack, said jumper cable means, the second set of pins of said further jack, and said multi-pin connector, to said multi-pair cable.

2. The board of claim 1, wherein each jack has a first state such that, when a plug is not inserted into said each jack, each respective pin of said first set of pins of said each jack is connected to a corresponding pin of said second set of pins of said each jack.

3. The board of claim 2 wherein each jack has a second state such that, when a plug is inserted into said each jack, the connection of each respective pin of said first set of pins to said corresponding pins of said second set of pins is broken.

4. A distribution frame board for connecting an input line to an output line, said board comprising:
    input connector means for connecting said input line to said board;
    output connector means for connecting said output line to said board; and
    jack means for interconnecting said input connector means and said output connector means;
    wherein said jack means comprises a first jack and a second jack, said first jack having a first state for connecting said input connector means directly to said output connector means, and said first jack having a second state for connecting said input connector means indirectly of said output connector means via said second jack;
    wherein each jack comprises alternating odd and even wires, each of said odd wires being connected to a corresponding one of said even wires when said each jack is in the first state, and the connections between said odd wires and said even wires within said each jack being broken when said each jack is in the second state.

5. The board of claim 4, wherein said first jack is adapted to receive a plug, and wherein said first jack is in said first state when said plug is not inserted into said firs jack, and said first jack assumes said second state when said plug is inserted into said first jack.

6. The board of claim 5, wherein said plug is disposed at one end of a jumper cable, said jumper cable having a further plug disposed at another end of said jumper cable, said further plug being inserted into said second jack when said plug is inserted into said first jack.

7. The board of claim 6, wherein said odd wires of said first jack are connected to said input connector means, said even wires of said first jack being connected to said output connector means in said first state, said odd wires of said first jack being connected via said jumper cable to said even wires of said second jack in said second state, said even wires of said second jack being connected to said output connector means.

* * * * *

UNITED STATES PATENT AND TRADEMARK OFFICE
CERTIFICATE OF CORRECTION

PATENT NO. : 4,829,564
DATED : May 9, 1989
INVENTOR(S) : J. Michael Jarvis

It is certified that error appears in the above-identified patent and that said Letters Patent is hereby corrected as shown below:

Claim 1, column 5, line 21, "par" should be "pair".

Claim 4, column 6, line 26, "of" should be "to".

Signed and Sealed this

Thirtieth Day of January, 1990

*Attest:*

JEFFREY M. SAMUELS

*Attesting Officer*      *Acting Commissioner of Patents and Trademarks*